United States Patent

(12) United States Patent
Kobayashi

(10) Patent No.: US 9,575,232 B2
(45) Date of Patent: Feb. 21, 2017

(54) METHOD FOR PRODUCING OPTICALLY ANISOTROPIC LAMINATED BODY

(71) Applicant: SUMITOMO CHEMICAL COMPANY, LIMITED, Chuo-ku, Tokyo (JP)

(72) Inventor: Tadahiro Kobayashi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 128 days.

(21) Appl. No.: 14/453,734

(22) Filed: Aug. 7, 2014

(65) Prior Publication Data
US 2015/0042940 A1    Feb. 12, 2015

(30) Foreign Application Priority Data
Aug. 9, 2013 (JP) ................ 2013-165942

(51) Int. Cl.
*G02F 1/1335* (2006.01)
*G02B 5/30* (2006.01)

(52) U.S. Cl.
CPC ........... *G02B 5/3016* (2013.01); *G02B 5/305* (2013.01)

(58) Field of Classification Search
CPC ..... G02B 5/3016; G02B 5/3083; G02B 5/305; G02B 1/10; Y10T 428/1005; Y10T 428/10; G02F 2001/133638; G02F 1/13; G02F 1/1333; G02F 1/1335; G02F 1/13363; G02F 1/133634
(Continued)

(56) References Cited

U.S. PATENT DOCUMENTS

| 5,780,629 A | 7/1998 | Etzbach et al. |
| 6,107,427 A | 8/2000 | Herr et al. |

(Continued)

FOREIGN PATENT DOCUMENTS

| JP | 9-506088 A | 6/1997 |
| JP | 2000-515496 A | 11/2000 |

(Continued)

OTHER PUBLICATIONS

"Liquid Crystal Device Handbook", Chapter 3, 4-3, Chiral Agents for TN and STN, p. 199, edited by Japan Society for the Promotion of Science, 142 Committee, 1989.
(Continued)

*Primary Examiner* — Thoi Duong
(74) *Attorney, Agent, or Firm* — Sughrue Mion, PLLC

(57) ABSTRACT

Provided is a method capable of producing an optically anisotropic laminated body in which defects are hardly generated so that light leakage is scarcely caused. This method is a method for producing an optically anisotropic laminated body including a substrate, an oriented film, and an optically anisotropic film, and has steps of: applying, to a surface of the substrate, an oriented-film-forming composition including an oriented-film-forming material and a solvent and having a viscosity of 4 mPa·s or less at 25° C., and drying the resultant to form the oriented film; and then applying, onto the resultant oriented film, an optically-anisotropic-layer-forming composition including a polymerizable liquid crystal compound, and drying the resultant to orient the polymerizable liquid crystal compound vertically to the surface of the substrate to form the optically anisotropic film.

8 Claims, 1 Drawing Sheet

(58) Field of Classification Search
USPC ... 349/194, 117, 119, 123, 75, 96, 158, 187; 252/299.01; 427/163.1, 164; 428/1.31, 1.2, 428/1.1
See application file for complete search history.

(56) References Cited

U.S. PATENT DOCUMENTS

| | | | |
|---|---|---|---|
| 6,217,792 | B1 | 4/2001 | Parri et al. |
| 6,723,395 | B2 | 4/2004 | May et al. |
| 7,995,665 | B2 | 8/2011 | Pare, Jr. et al. |
| 2002/0045015 | A1* | 4/2002 | Ito .................. C09K 19/32 428/1.2 |
| 2006/0040070 | A1* | 2/2006 | Ito .................. G02B 5/3016 428/1.31 |
| 2012/0257145 | A1* | 10/2012 | Lee .................. G02B 5/3016 349/75 |

FOREIGN PATENT DOCUMENTS

| | | |
|---|---|---|
| JP | 2003-137887 A | 5/2003 |
| JP | 2006-57051 A | 3/2006 |
| JP | 2006-323060 A | 11/2006 |
| JP | 2007-156439 A | 6/2007 |
| JP | 2007-169178 A | 7/2007 |
| JP | 2007-232934 A | 9/2007 |
| JP | 2007-269639 A | 10/2007 |
| JP | 2007-269640 A | 10/2007 |
| JP | 4011652 B2 | 11/2007 |
| JP | 4404090 B2 | 1/2010 |
| JP | 2010-31223 A | 2/2010 |
| JP | 2010-49230 A | 3/2010 |
| JP | 4450261 B2 | 4/2010 |
| JP | 2010-270108 A | 12/2010 |
| JP | 2011-6360 A | 1/2011 |
| JP | 2011-207765 A | 10/2011 |
| JP | 2012-83734 A | 4/2012 |
| JP | 2013-57803 A | 3/2013 |

OTHER PUBLICATIONS

"Handbook of Liquid Crystals", Chapter 3.8.6. Network (Fully Cross-Linked), 6.5.1. Liquid Crystal Material, b. Polymerizable Nematic Liquid Crystal Material, edited by Ekisho Binran Henshu linkai, Maruzen, Oct. 30, 2000.

"Testing methods for paints—Part 5: Mechanical property of film", Japanese Industrial Standard, JIS K 5600-5-6: 1999, 14 total pages.

\* cited by examiner

METHOD FOR PRODUCING OPTICALLY ANISOTROPIC LAMINATED BODY

CROSS REFERENCE TO RELATED APPLICATIONS

This application claims priority based on Japanese Patent Application No. 2013-165942 filed Aug. 9, 2013, the contents of all of which are incorporated herein by reference in their entirety.

BACKGROUND OF THE INVENTION

Field of the Invention

The present invention relates to a method for producing optically anisotropic laminated body.

Description of the Related Art

A flat panel display device includes an optically anisotropic film such as a polarizing plate or a retardation plate. An optically anisotropic laminated body including a substrate, an oriented film and an optically anisotropic film is produced by applying, to the substrate, a composition containing an oriented-film-forming material to form the oriented film; applying, onto the resultant oriented film, a composition containing a polymerizable liquid crystal compound; and polymerizing the polymerizable liquid crystal compound.

In production methods of the related art, defects are generated in their optically anisotropic laminated body so that light may leak therefrom.

SUMMARY OF THE INVENTION

The present invention is as follows:
[1] A method for producing an optically anisotropic laminated body comprising a substrate, an oriented film, and an optically anisotropic film,
including: applying, to a surface of the substrate, an oriented-film-forming composition comprising an oriented-film-forming material and a solvent and having a viscosity of 4 mPa·s or less at 25° C., and drying the resultant to form the oriented film, and
applying, onto the resultant oriented film, an optically-anisotropic-layer-forming composition comprising a polymerizable liquid crystal compound, and drying the resultant to orient the polymerizable liquid crystal compound vertically to the surface of the substrate to form the optically anisotropic film.
[2] The producing method according to item [1], wherein the oriented-film-forming material comprises at least one selected from the group consisting of polyimides, polyamides, and polyamic acids.
[3] The producing method according to item [1] or [2], wherein the substrate comprises a polyolefin.
[4] The producing method according to any one of items [1] to [3], wherein the oriented-film-forming composition is applied by use of any one selected from the group consisting of a die coater, a gravure coater and a slit coater.
[5] The producing method according to any one of items [1] to [4], wherein at the time of applying the oriented-film-forming composition to the substrate surface and drying the resultant, the carrying speed of the substrate is 5 m/min or more.
[6] The producing method according to any one of items [1] to [5], wherein the optically anisotropic film is a retardation film.
[7] The producing method according to any one of items [1] to [6], wherein the laminated body is a laminated body for an in-plane switching (IPS) liquid crystal display device.
[8] A polarizing plate, comprising the laminated body produced by the producing method recited in any one of items [1] to [7].
[9] A display device, comprising the laminated body produced by the producing method recited in any one of items [1] to [7].

According to the producing method of the present invention, an optically anisotropic laminated body can be obtained in which defects are hardly generated so that light leakage is scarcely caused.

DETAILED DESCRIPTION OF THE PREFERRED EMBODIMENTS

Figure 1:
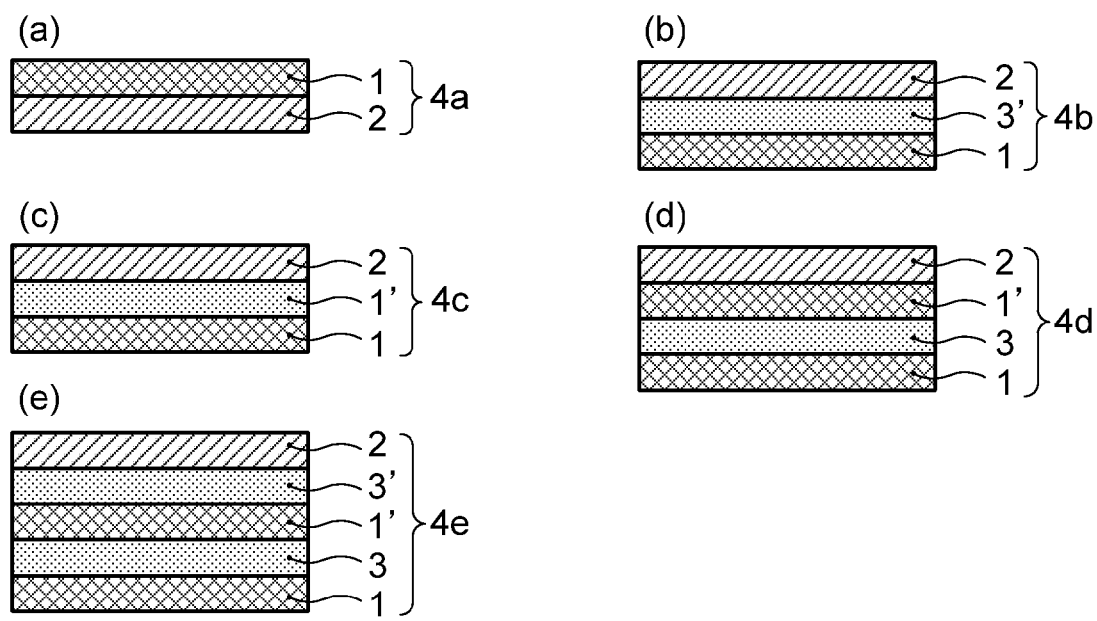
FIGS. 1A to 1E are each a schematic view illustrating an example of a polarizing plate including an optically anisotropic laminated body obtained by the producing method of the present invention.

<Oriented-Film-Forming Composition>
[Oriented-Film-Forming Material]
Examples of the oriented-film-forming material include orienting polymers and optically orienting polymers. Preferred are orienting polymers.

The oriented-film-forming material has such a solvent resistance that this material is not dissolved in a solvent used when a composition containing a polymerizable liquid crystal compound that will be detailed later is applied or painted, and a heat resistance against heating treatment for removing an organic solvent and adjusting the orientation of the polymerizable liquid crystal compound.

Examples of the orienting polymer include polyamides and gelatins, which each have in the molecule thereof amide bonds, polyimides, which each have in the molecule thereof imide bonds, polyamic acids, which are each a hydrolyzate of a polyimide, polyvinyl alcohol, alkyl-modified polyvinyl alcohol, polyacrylamide, polyoxazole, polyethyleneimine, polystyrene, polyvinyl pyrrolidone, polyacrylic acid, and polyacrylates. Of these examples, preferred is at least one selected from the group consisting of polyamides, polyimides, and polyamic acids. Such orienting polymers may be used alone, or in the form of a composition or copolymer made of any combination of two or more thereof. The orienting polymer can easily be obtained by subjecting a monomer thereof to a polycondensation based on dehydration or dealcoholization, a chain polymerization such as radical polymerization, anion polymerization or cation polymerization, coordination polymerization, ring-opening polymerization or some other polymerization.

Examples of a commercially available product of the orienting polymer include products Sunever ((registered trademark) manufactured by Nissan Chemical Industries, Ltd.), and Optmer ((registered trademark) manufactured by JSR Corporation).

An oriented film formed by use of the orienting polymer makes the liquid crystal orientation of a polymerizable liquid crystal compound easy. In accordance with the kind of the orienting polymer or rubbing conditions therefor, the liquid crystal can be controlled into various orientations such as horizontal orientation, vertical orientation, hybrid orientation and oblique orientation. The oriented film is usable for an improvement in the visual field angle of various liquid crystal panels.

The optically orienting polymer may be a polymer having a photosensitive structure. When polarized light is radiated onto the polymer having a photosensitive structure, the photosensitive structure in the light-radiated region is isomerized or crosslinked so that the optically orienting polymer is oriented. As a result, orientation regulating force is given to a film made of the optically orienting polymer. Examples of the photosensitive structure include azobenzene, maleimide, chalcone, cinnamic acid, 1,2-vinylene, 1,2-acetylene, spiropyran, spirobenzopyran, and fulgide structures. Such optically orienting polymers may be used alone, in the form of a combination of two or more thereof, or in the form of a copolymer having different photosensitive structures. The optically orienting polymer can be obtained by subjecting a monomer having a photosensitive structure to polycondensation based on dehydration or dealcoholization, a chain polymerization such as radical polymerization, anion polymerization or cation polymerization, coordination polymerization, ring-opening polymerization or some other polymerization. Examples of the optically orienting polymer include optically orienting polymers described in Japanese Patent Nos. 4450261, 4011652 and 4404090, and Japanese unexamined patent publications JP-A-2010-49230, JP-A-2007-156439 and JP-A-2007-232934. Of these examples, preferred are polymers that can each form a crosslinked structure by irradiation with polarized light from the viewpoint of the endurance thereof.

The oriented-film-forming composition contains a solvent. Examples of the solvent include water; alcohol solvents such as methanol, ethanol, ethylene glycol, isopropyl alcohol, propylene glycol, methylcellosolve, and butylcellosolve; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, methyl isobutyl ketone, and N-methyl-2-pyrrolidone; aliphatic hydrocarbon solvents such as pentane, hexane, heptane, methylcyclohexane, ethylcyclohexane, and propylcyclohexane; aromatic hydrocarbon solvents such as toluene, xylene and chlorobenzene; nitrile solvents such as acetonitrile; ether solvents such as propylene glycol monomethyl ether, tetrahydrofuran, and dimethoxyethane; and halogenated hydrocarbon solvents such as chloroform. These solvents may be used alone or in combination.

About the oriented-film-forming composition, the viscosity at 25° C. is usually 4 mPa·s or less, preferably 3.5 mPa·s or less. When the viscosity of the composition is 4 mPa·s or less, the composition is favorably improved not only in evenness, but also in productivity, which will also be described later. The viscosity of the composition is usually 1 mPa·s or more, preferably 1.5 mPa·s or more, more preferably 2 mPa·s or more.

Examples of a device for measuring the viscosity include a vibration viscometer, a falling ball viscometer, a rotational double coaxial cylinder viscometer, a rotational single cylinder viscometer, and a rotational cone-plate viscometer.

The concentration of any solid in the oriented-film-forming material is usually 3% or less, preferably 2% or less, more preferably 1% or less. It is usually sufficient for the oriented film to be a thin film having a thickness of several tens of nanometers to several hundreds of nanometers. As the solid concentration is smaller, the composition favorably tends to become lower in viscosity.

<Substrate>

The substrate is preferably a resin substrate.

The resin substrate is usually a translucent resin substrate. The translucent resin substrate means a resin substrate having such a translucency that the substrate can transmit light, in particular, visible rays. Translucency denotes a property that the transmittance of any object or member for light rays having wavelengths from 380 to 780 nm is 80% or more. The resin substrate may be usually a substrate in the form of a film.

Examples of the resin that constitutes the translucent resin substrate include polyolefins such as polyethylene, polypropylene, cycloolefin polymers, and norbornene-based polymers; polyvinyl alcohol; polyethylene terephthalate; polymethacrylates; polyacrylates; cellulose esters; polyethylene naphthalate; polycarbonates; polysulfones; polyethersulfones; polyetherketones; polyphenylene sulfides; and polyphenylene oxides. Preferred are polyolefins such as polyethylene, polypropylene and norbornene-based polymers, polyethylene terephthalate, and polymethacrylates. More preferred are such polyolefins.

Before the oriented film is formed onto the resin substrate, the resin substrate may be subjected to surface treatment. Examples of the method for the surface treatment include a method of treating a surface of the resin substrate with corona or plasma in a vacuum or in the atmosphere; a method of treating a surface of the resin substrate with a laser; a method of treating a surface of the resin substrate with ozone; a method of subjecting a surface of the resin substrate to saponifying treatment or flame treatment; a method of painting a coupling agent onto a surface of the resin substrate to conduct primer treatment; and a graft polymerization method of causing a reactive monomer or a polymer having reactivity to adhere onto a surface of the resin substrate, and then radiating radial rays, plasma or ultraviolet rays thereto to cause a reaction of the monomer or polymer. Of these examples, preferred is the method of treating a surface of the resin substrate with corona or plasma in a vacuum or in the atmosphere.

The method of treating a surface of the resin substrate with corona or plasma is, for example, a method i) of setting the resin substrate between opposed electrodes under a pressure close to the atmospheric pressure, and then generating corona or plasma to treat the surface of the resin substrate therewith, a method ii) of causing a gas to flow into the gap between opposed electrodes, making the gas into plasma between the electrodes, and blowing the plasma-state gas onto the surface of the resin substrate; or a method iii) of generating glow discharge plasma under a low pressure to treat the surface of the resin substrate therewith.

Of these methods, preferred are the methods i) and ii). Usually, these surface treatments with corona or plasma can be conducted in a commercially available surface treatment apparatus.

Examples of the method for forming the oriented film on/over a surface of the substrate include a method A) of applying the oriented-film-forming composition to the resin substrate, and drying the resultant; a method B) of applying the oriented-film-forming composition to the resin substrate, drying the resultant, and rubbing the outer surface of the dried product; and a method C) of applying the orientedfilm-forming composition to the resin substrate, drying the resultant, and radiating polarized light onto the dried product.

Of these methods, preferred are the methods A) and B) from the viewpoint of the evenness of the liquid crystal orientation of the polymerizable liquid crystal compound formed on the oriented film, and the period and costs for the production.

By the drying, the solvent and other low-boiling-point components are removed.

Examples of the method for applying the oriented-film-forming composition to the resin substrate include extrusion coating, direct gravure coating, reverse gravure coating, CAP coating, die coating, and slit coating methods; and a method of attaining the application, using a coater such as a dip coater, a bar coater, or a spin coater. Of these methods, preferred are die coating, gravure coating and slit coating methods since these methods make it possible to attain a continuous production in a roll-to-roll manner, and make an improvement in the evenness of the resultant coat.

Examples of the method for the drying include natural drying, ventilation drying, heat drying, and reduced-pressure drying; and any combination of two or more of these methods. The drying temperature is preferably from 10 to 250° C., more preferably from 25 to 200° C. The drying period, which depends on the kind of the solvent, is preferably from 5 seconds to 60 minutes, more preferably from 10 seconds to 30 minutes.

In the step of applying the oriented-film-forming composition to the resin substrate, the carrying speed of the substrate is usually 4 m/min or more, preferably 5 m/min or more. In a case where the viscosity of the composition and the solid concentration therein are too high, the liquid does not sufficiently be applied on the substrate so that the applied composition deteriorates in evenness if the carrying speed of the substrate is too large. When the oriented-film-forming composition has the above-mentioned physical properties, the carrying speed of the substrate may be set to 5 m/min or more. This speed favorably results in an improvement in oriented-film productivity.

Only by applying and drying the oriented-film-forming material, some species of the material may exhibit a property of causing a polymerizable liquid crystal compound to be liquid-crystal oriented (hereinafter the property may be referred to as orientation regulating force) in accordance with the kind thereof. Other species of the oriented-film-forming material may exhibit orientation regulating force by further rubbing the material or radiating polarized light to the material.

The method for the rubbing may be a method of bringing a rubbing-cloth-wound rubbing roll that is being rotated into contact with a coat formed by applying the oriented-film-forming composition to the resin substrate and then drying the resultant (hereinafter such a coat may be referred to as a dried coat).

In the case of a dried coat formed from the optically orienting polymer, polarized light is usually radiated onto the polymer. The optically orienting polymer is preferably a polymer that forms a crosslinked structure by irradiation with light from the viewpoint of the endurance of the resultant oriented film.

The method for radiating the polarized light is, for example, a method by use of a device described in JP-A-2006-323060. A patterned oriented film can be formed by radiating polarized light, such as linearly polarized ultraviolet rays, onto a desired region (composed of plural sections) through a photomask corresponding to the desired region, and repeating this operation also for each of other desired regions. Generally, the photomask may be a member in which a light-shielding pattern is located onto a piece or film made of quartz, soda-lime glass, polyester or some other material. The region covered with the light-shielding pattern shuts out the radiated polarized light while the region uncovered therewith transmits the polarized light. The quartz glass piece is preferred since the effect of thermal expansion to the piece is small. The radiated polarized light is preferably ultraviolet rays from the viewpoint of the reactivity of the optically orienting polymer with the rays.

The thickness of the oriented film is usually from 10 to 10000 nm, preferably from 10 to 1000 nm. When the thickness of the oriented film is in the range, a polymerizable liquid crystal compound can be favorably oriented into a desired direction or angle on the oriented film.

In the laminated body obtained by the above-mentioned method, which is composed of the substrate and the oriented film, the adhesiveness between the oriented film and the resin substrate is high; thus, when the laminated body is worked, the oriented film can be restrained from being peeled from the resin substrate. The adhesiveness can be estimated in an adhesion test according to JIS-K 5600. It is advisable to make the adhesion test, using a commercially available device, such as a Cross-Cut Guide I Series device (CCI-1; a device for 25 squares having intervals of 1 mm) manufactured by Cotec Corporation. When the adhesion test is made, using, for example, this device (CCI-1), the number of squares in each of which the oriented film is held without being peeled from the resin substrate, out of the 25 squares, is usually 9 or more. Thus, 36% or more by area of the oriented film is held on the resin substrate without being peeled from the substrate.

The laminated body obtained by the above-mentioned method, which is composed of the substrate and the oriented film, is useful as a substrate for forming an optically anisotropic film such as a retardation film or a polarization film. The laminated body is also useful as a member for a polarizing plate or circularly polarizing plate that includes such an optically anisotropic film. The laminated body is useful, in particular, as a substrate of a retardation film.

<Optically Anisotropic Film>

Subsequently, an optically-anisotropic-layer-forming composition containing a polymerizable liquid crystal compound is applied onto the resultant oriented film, and the workpiece is dried to orient the polymerizable liquid crystal compound vertically to the surface of the substrate. In this way, an optically anisotropic film is formed. In the present invention, such a wording as "vertical orientation" (of a polymerizable liquid crystal compound) denotes that the polymerizable liquid crystal compound has a long axis thereof vertically to the plane of the substrate. Such a wording as "horizontal orientation" thereof denotes that the polymerizable liquid crystal compound has along axis thereof in parallel with the plane of the substrate.

The polymerizable liquid crystal compound is a liquid crystal compound having a polymerizable group. Usually, the polymerizable liquid crystal compound forms an optically anisotropic film by liquid-crystal-orienting this compound on the outer surface of an oriented film and then polymerizing the compound.

The liquid crystal orientation of the polymerizable liquid crystal compound is controlled by respective properties of the oriented film and the polymerizable liquid crystal compound. For attaining vertical orientation, it is preferred to select a polymerizable liquid crystal compound that is vertically oriented with ease, and an oriented film that easily causes this polymerizable liquid crystal compound to be vertically oriented.

When the oriented film is made of, for example, a material expressing, as orientation regulating force, horizontal orientation regulating force, the polymerizable liquid crystal compound can attain horizontal orientation or hybrid orientation. When the oriented film is made of a material expressing vertical orientation regulating force, the polymerizable liquid crystal compound can attain vertical orientation or oblique orientation.

When the oriented film is made of an orienting polymer, the orientation regulating force is adjustable at will in accordance with the outer surface state or rubbing conditions. When the oriented film is made of an optically orienting polymer, the force is adjustable at will in accordance with polarized-light-radiating conditions and others. The liquid crystal orientation is also controllable by selecting the surface tension, the liquid crystal property or some other property of the polymerizable liquid crystal compound.

The optically-anisotropic-layer-forming composition may contain two or more polymerizable liquid crystal compounds.

The above-mentioned polymerizable liquid crystal compound is, for example, a compound containing a group represented by the following formula (X) (the compound may be referred to as the compound (X) hereinafter):

$P^{11}$—$B^{11}$-$E^{11}$-$B^{12}$-$A^{11}$-$B^{13}$— (X)

wherein:

$P^{11}$ represents a polymerizable group;

$A^{11}$ represents a bivalent alicyclic hydrocarbon group or bivalent aromatic hydrocarbon group provided that any hydrogen atom contained in the bivalent alicyclic hydrocarbon group or bivalent aromatic hydrocarbon group may be substituted with a halogen atom, an alkyl group having 1 to 6 carbon atoms, an alkoxy group having 1 to 6 carbon atoms, a cyano group or a nitro group provided that any hydrogen atom contained in the alkyl group having 1 to 6 carbon atoms or the alkoxy group having 1 to 6 carbon atoms may be substituted with a fluorine atom;

$B^{11}$ represents —O—, —S—, —CO—O—, —O—CO—, —O—CO—O—, —CO—$NR^{16}$—, —$NR^{16}$—CO—, —CO—, —CS— or a single bond wherein $R^{16}$s each represent a hydrogen atom or an alkyl group having 1 to 6 carbon atoms (the same applies to the following $R^{16}$s);

$B^{12}$ and $B^{13}$ each independently represent —C≡C—, —CH=CH—, —$CH_2$—$CH_2$—, —O—, —S—, —C(=O)—, —C(=O)—O—, —O—C(=O)—, —O—C(=O)—O—, —CH=N—, —N=CH—, —N=N—, —C(=O)—$NR^{16}$—, —$NR^{16}$—C(=O)—, —$OCH_2$—, —$OCF_2$—, —$CH_2$O—, —$CF_2$O—, —CH=CH—C(=O)—O—, —O—C(=O)—CH=CH—, or a single bond; and $E^{11}$ represents an alkanediyl group having 1 to 12 carbon atoms provided that any hydrogen atom contained in the alkanediyl group may be substituted with an alkoxy group having 1 to 5 carbon atoms provided that any hydrogen atom contained in the alkoxy group may be substituted with a halogen atom, and provided that any —$CH_2$— that constitutes the alkanediyl group may be replaced with —O— or —CO—.

The number of the carbon atoms of the aromatic hydrocarbon group or alicyclic hydrocarbon group as $A^{11}$ is preferably from 3 to 18, more preferably from 5 to 12, in particular preferably 5 or 6. $A^{11}$ is preferably a cyclohexane-1,4-diyl group, or 1,4-phenylene group.

$E^{11}$ is preferably a linear alkanediyl group having 1 to 12 carbon atoms. Any —$CH_2$— that constitutes the alkanediyl group may be replaced with —O—.

Specific examples of the group include linear alkanediyl groups having 1 to 12 carbon atoms, such as methylene, ethylene, propane-1,3-diyl, butane-1,4-diyl, pentane-1,5-diyl, hexane-1,6-diyl, heptane-1,7-diyl, octane-1,8-diyl, nonane-1,9-diyl, decane-1,10-diyl, undecane-1,11-diyl, and dodecane-1,12-diyl groups; and —$CH_2$—$CH_2$—O—$CH_2$—$CH_2$—, —$CH_2$—$CH_2$—O—$CH_2$—$CH_2$—O—$CH_2$—$CH_2$—, and —$CH_2$—$CH_2$—O—$CH_2$—$CH_2$—O—$CH_2$—$CH_2$—O—$CH_2$—$CH_2$—.

$B^{11}$ is preferably —O—, —S—, —CO—O—, or —O—CO—, more preferably —CO—O—.

$B^{12}$ and $B^{13}$ are each independently preferably —O—, —S—, —C(=O)—, —C(=O)—O—, —O—C(=O)—, or —O—C(=O)—O—, more preferably —O—, or —O—C(=O)—O—.

The polymerizable group represented by $P^{11}$ is preferably a radical polymerizable group or cation polymerizable group since the group is high in polymerization reactivity, in particular, photopolymerization reactivity. The polymerizable group is preferably a group represented by any one of the following formulae (P-11) to (P-15) since the group is easy to handle, and the production itself of the polymerizable liquid crystal compound is also easy:

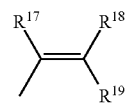 (P-11)

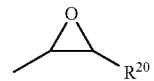 (P-12)

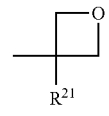 (P-13)

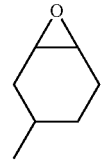 (P-14)

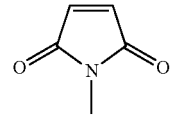 (P-15)

wherein $R^{17}$ to $R^{21}$ in the formulae (P-11) to (P-13) each independently represent an alkyl group having 1 to 6 carbon atoms, or a hydrogen atom.

Specific examples of the group represented by any one of the formulae (P-11) to (P-15) include respective groups represented by the following formulae (P-16) to (P-20):

 (P-16)

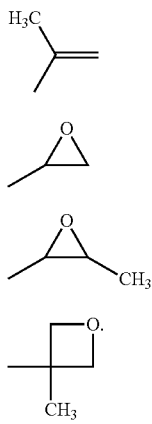

(P-17)

(P-18)

(P-19)

(P-20)

$P^{11}$ is preferably a group represented by any one of the formulae (P-14) to (P-20), more preferably a vinyl, p-stilbene, epoxy or oxetanyl group.

More preferably, the group represented by $P^{11}$—$B^{11}$— is an acryloyloxy or methacryloyloxy group.

Examples of the compound (X) include respective compounds represented by the following formulae (I), (II), (III), (IV), (V) and (VI):

$$P^{11}-B^{11}-E^{11}-B^{12}-A^{11}-B^{13}-A^{12}-B^{14}-A^{13}-B^{15}-A^{14}-B^{16}-E^{12}-B^{17}-P^{12} \quad (I),$$

$$P^{11}-B^{11}-E^{11}-B^{12}-A^{11}-B^{13}-A^{12}-B^{14}-A^{13}-B^{15}-A^{14}-F^{11} \quad (II),$$

$$P^{11}-B^{11}-E^{11}-B^{12}-A^{11}-B^{13}-A^{12}-B^4-A^{13}-B^{15}-E^{12}-B^{17}-P^{12} \quad (III),$$

$$P^{11}-B^{11}-E^{11}-B^{12}-A^{11}-B^{13}-A^{12}-B^{14}-A^{13}-F^{11} \quad (IV),$$

$$P^{11}-B^{11}-E^{11}-B^{12}-A^{11}-B^{13}-A^{12}-B^{14}-E^{12}-B^{17}-P^{12} \quad (V), \text{ and}$$

$$P^{11}-B^{11}-E^{11}-B^{12}-A^{11}-B^{13}-A^{12}-F^{11} \quad (VI)$$

wherein $A^{12}$ to $A^{14}$ each independently have the same meaning as $A^{11}$; $B^{14}$ to $B^{16}$ each independently have the same meaning as $B^{12}$; $B^{17}$ has the same meaning as $B^{11}$; $E^{12}$ has the same meaning as $E^{11}$; and $F^{11}$ represents a hydrogen or halogen atom, or an alkyl group having 1 to 13 carbon atoms, an alkoxy group having 1 to 13 carbon atoms, a cyano, nitro, trifluoromethyl, dimethylamino, hydroxyl, methylol, formyl, sulfo (—$SO_3H$) or carboxyl group, or an alkoxycarbonyl group having 1 to 10 carbon atoms provided that any —$CH_2$— that constitutes the alkyl or alkoxy group may be replaced with —O—.

Specific examples of the polymerizable liquid crystal compound include compounds each having a polymerizable group out of compounds described in "3.8.6 Network (Completely Crosslinked Type)" and "6.5.1 Liquid Crystal Material, b. Polymerizable Nematic Liquid Crystal Material" in "Liquid Crystal Handbook" (edited by Liquid Crystal Handbook Editorial Committee, and published by Maruzen Publishing Co., Ltd. on Oct. 30, 2000); and polymerizable liquid crystal compounds described in JP-A-2010-31223, JP-A-2010-270108, JP-A-2011-6360, and JP-A-2011-207765.

Specific examples of the compound (X) include respective compounds represented by formulae (I-1) to (I-4), formulae (II-1) to (II-4), formulae (III-1) to (III-26), formulae (IV-1) to (IV-26), formulae (V-1) to (V-2), and formulae (VI-1) to (VI-6) illustrated below. In these formulae, k1s and k2s each independently represent an integer of 2 to 12. These compounds (X) are preferred since they can easily be synthesized or are easily available.

(I-1)
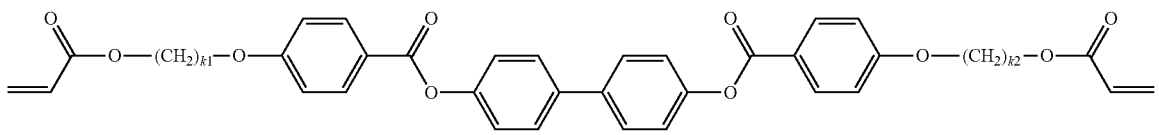

(I-2)
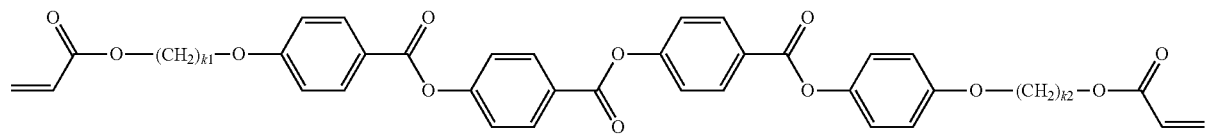

(I-3)
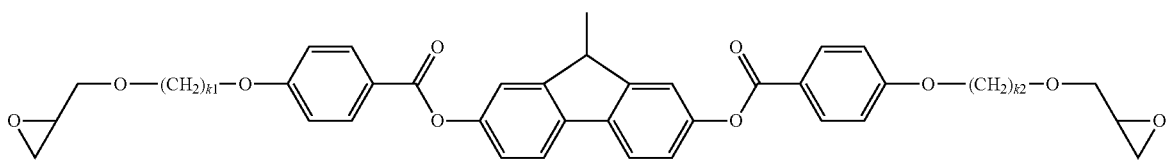

(I-4)
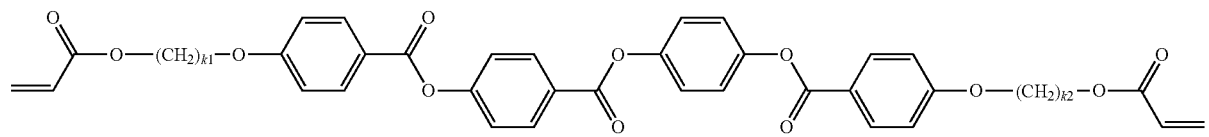

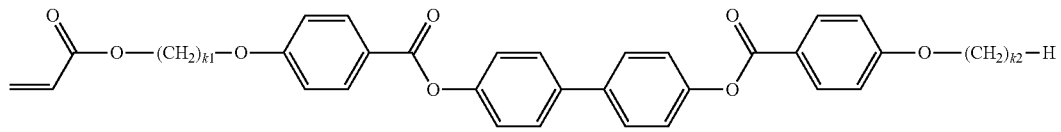
(II-1)
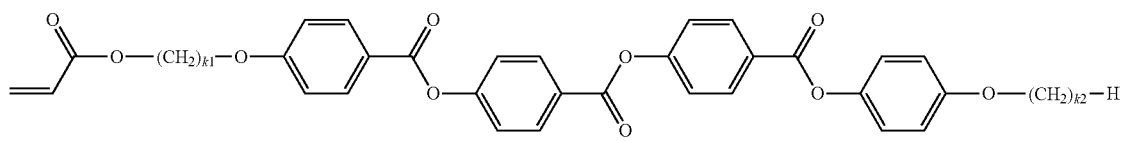
(II-2)
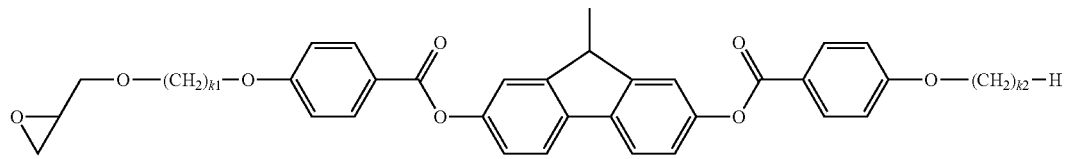
(II-3)
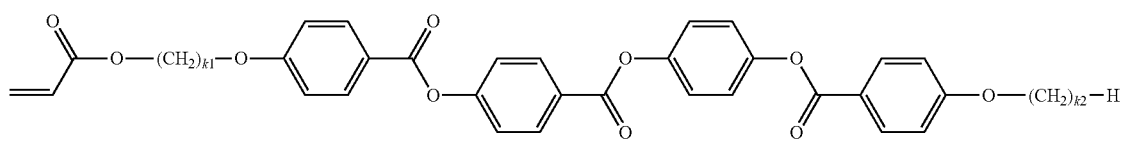
(II-4)
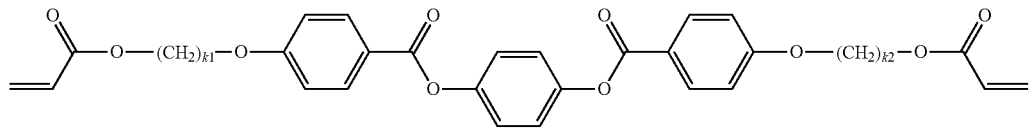
(III-1)
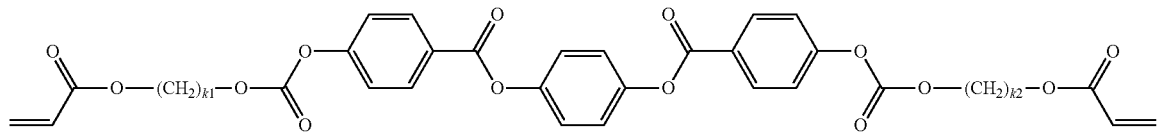
(III-2)
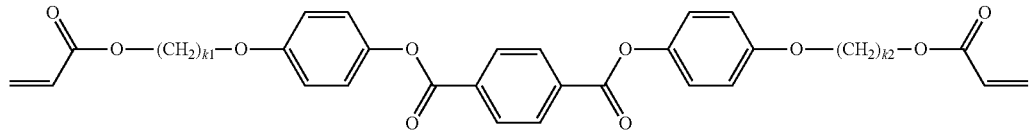
(III-3)
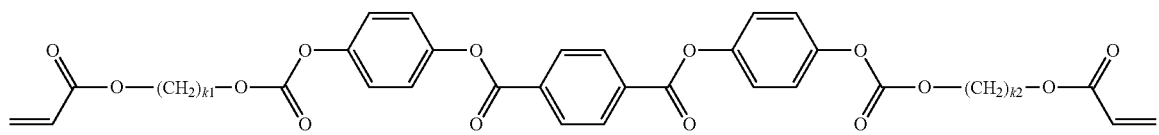
(III-4)
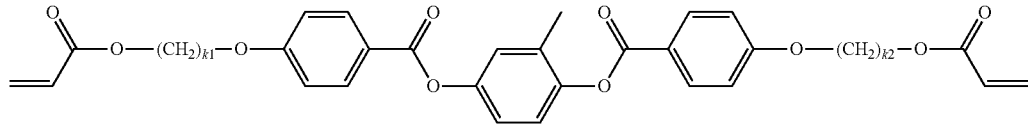
(III-5)
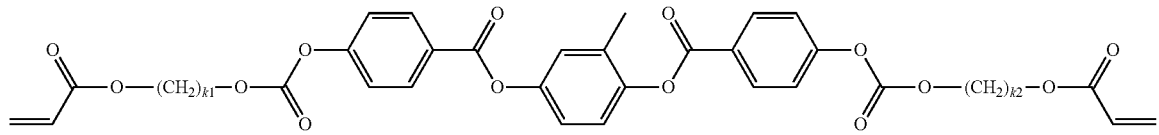
(III-6)

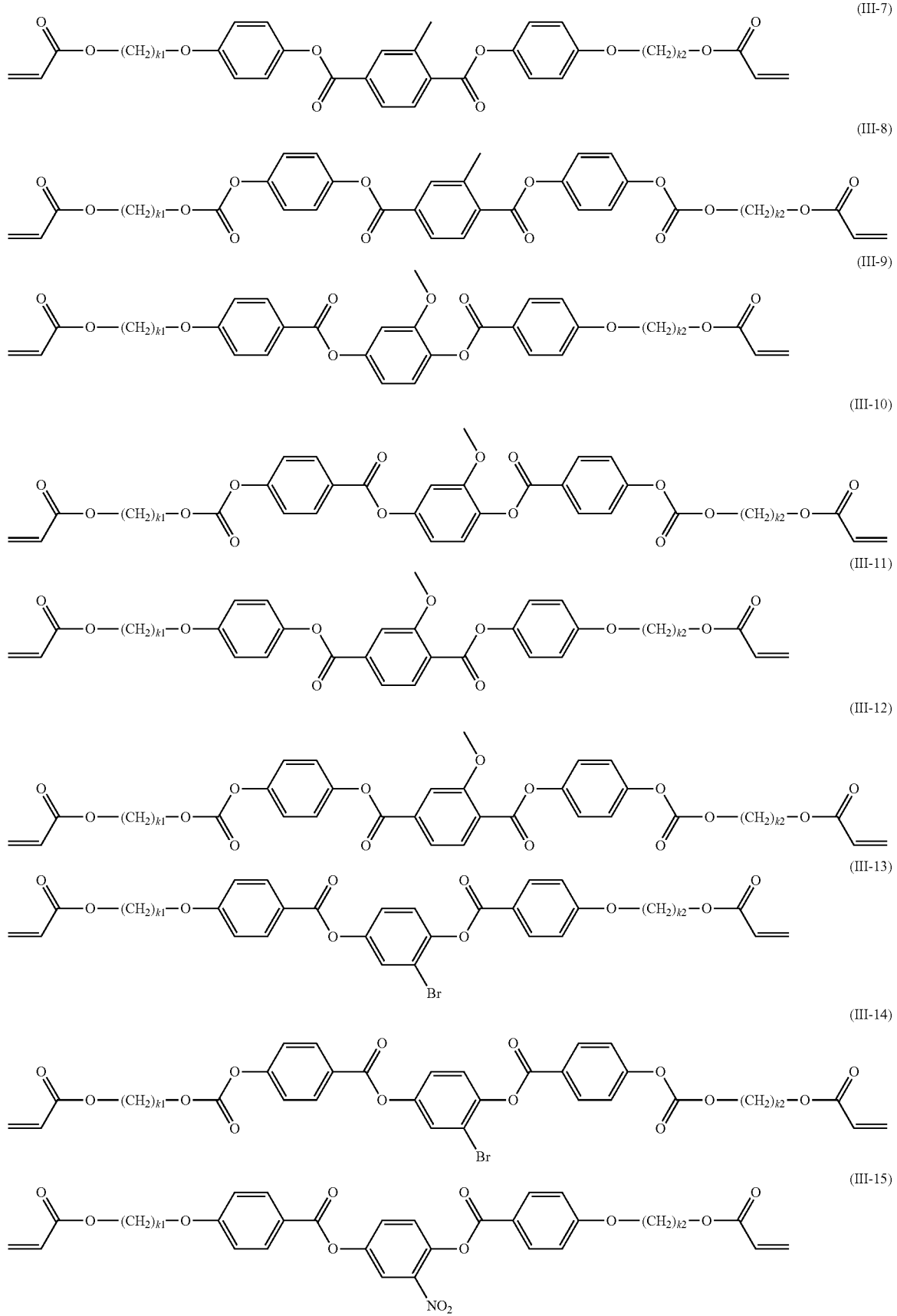

-continued
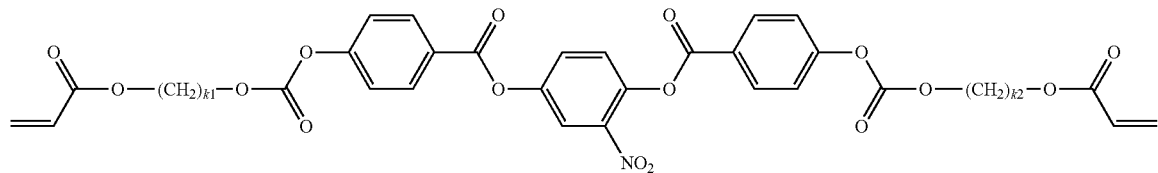
(III-16)
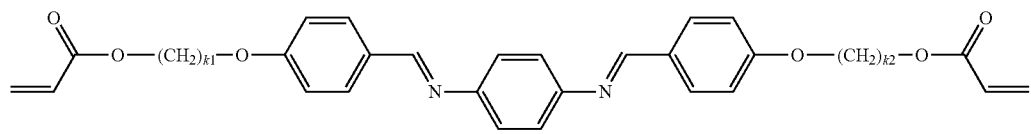
(III-17)
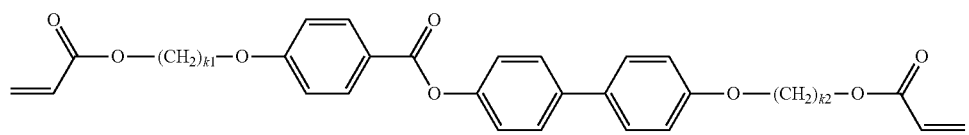
(III-18)
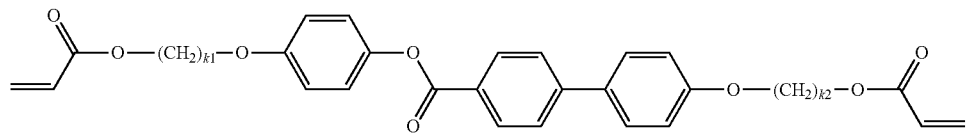
(III-19)
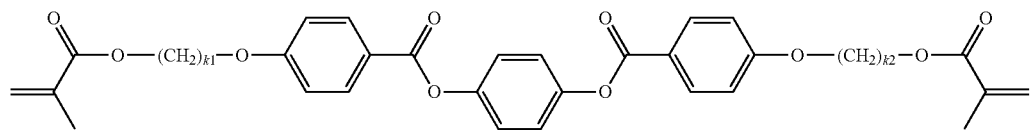
(III-20)
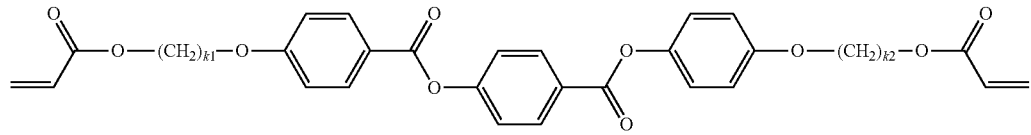
(III-21)
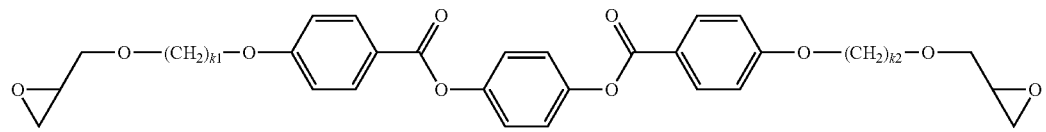
(III-22)
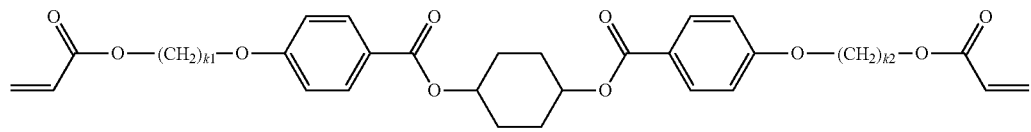
(III-23)
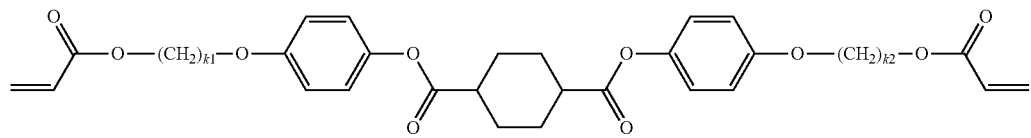
(III-24)
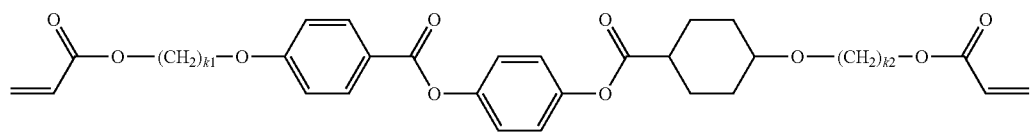
(III-25)

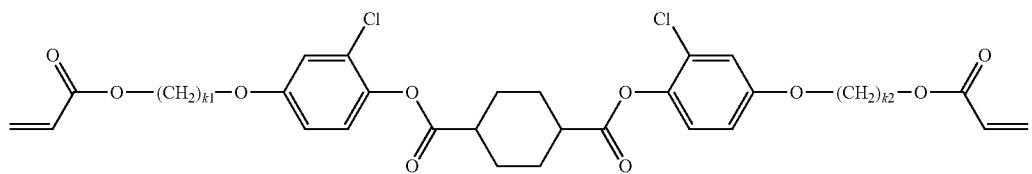
(III-26)
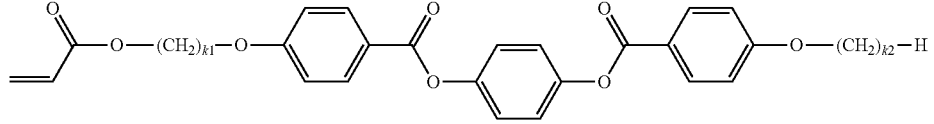
(IV-1)
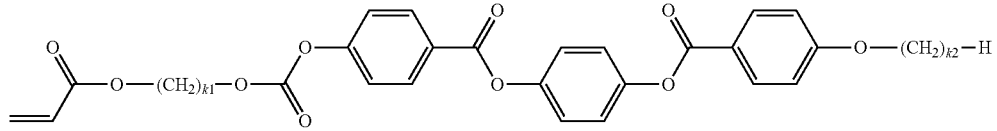
(IV-2)
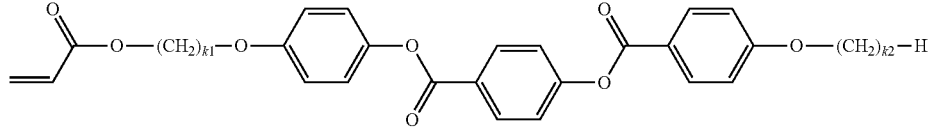
(IV-3)
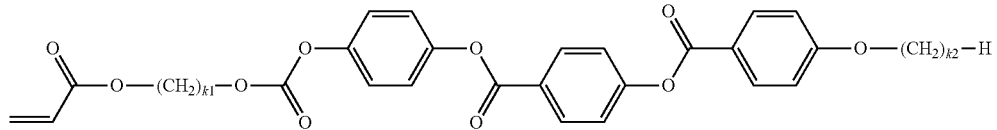
(IV-4)
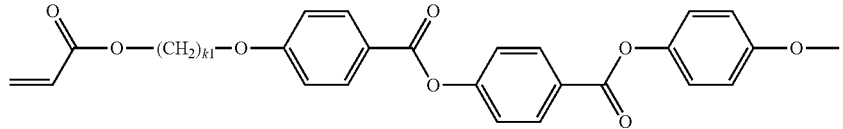
(IV-5)
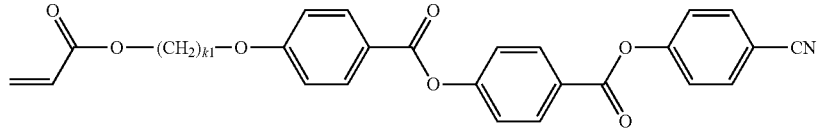
(IV-6)
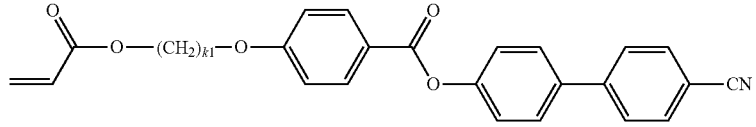
(IV-7)
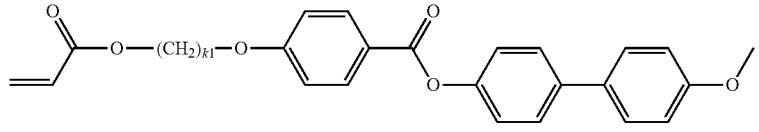
(IV-8)
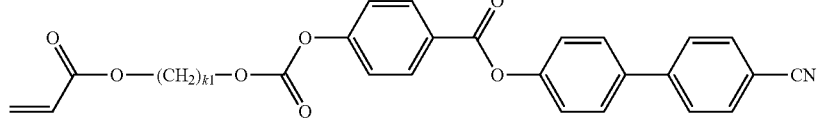
(IV-9)
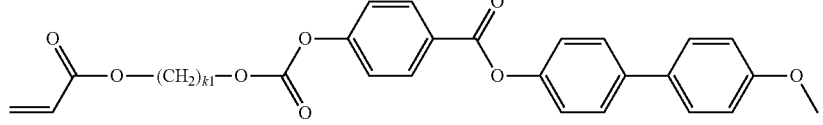
(IV-10)

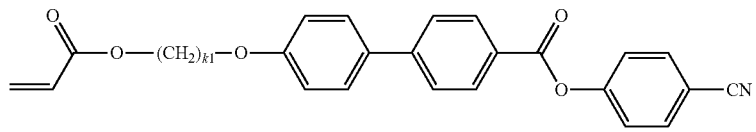
(IV-11)
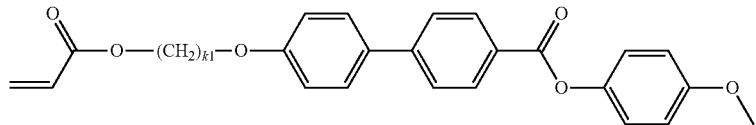
(IV-12)
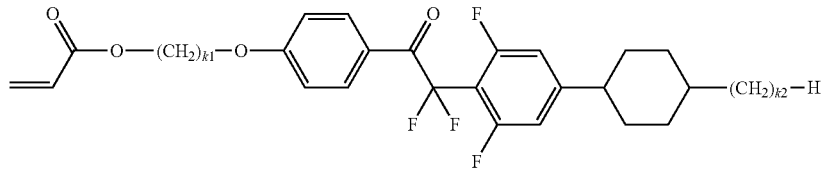
(IV-13)
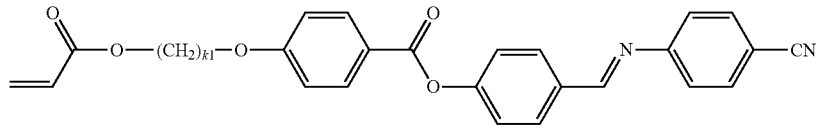
(IV-14)
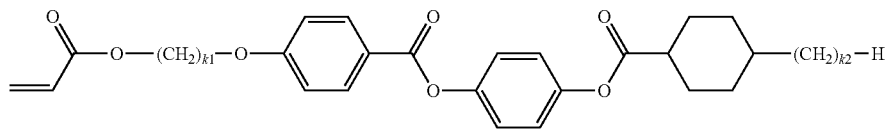
(IV-15)
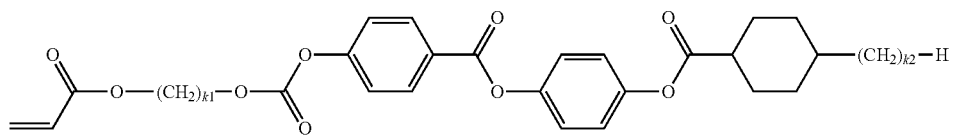
(IV-16)
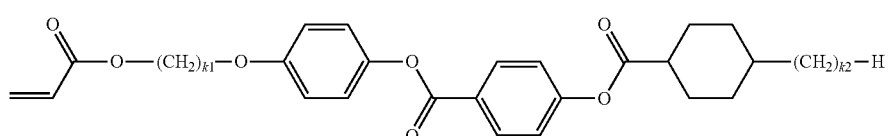
(IV-17)
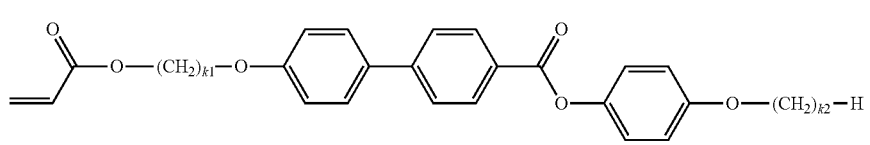
(IV-18)
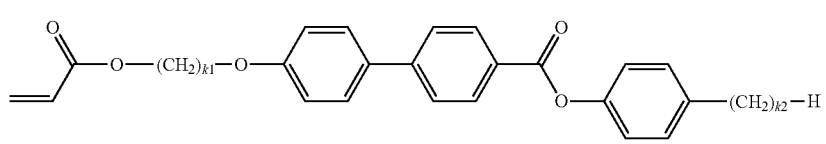
(IV-19)
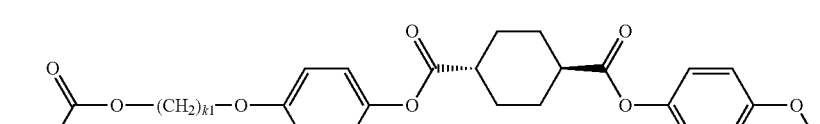
(IV-20)
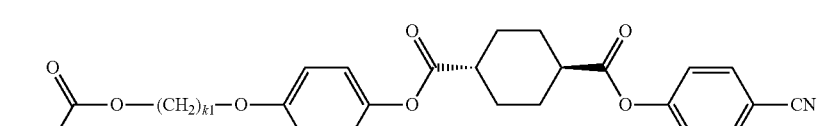
(IV-21)

-continued
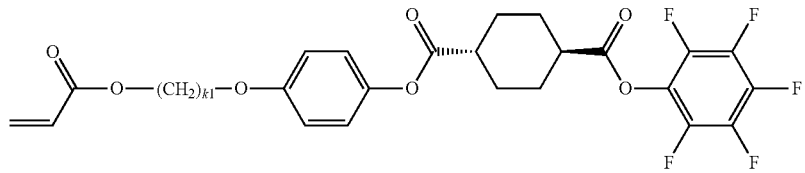
(IV-22)
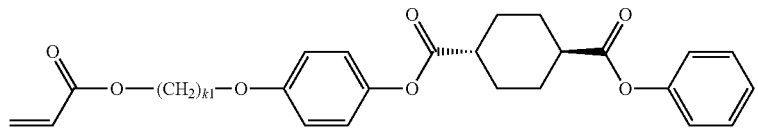
(IV-23)
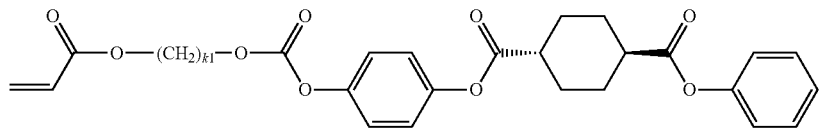
(IV-24)
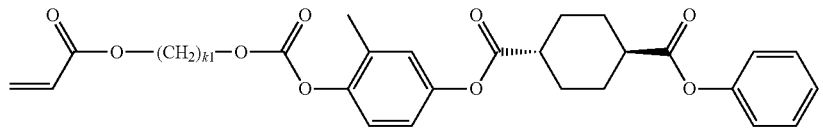
(IV-25)
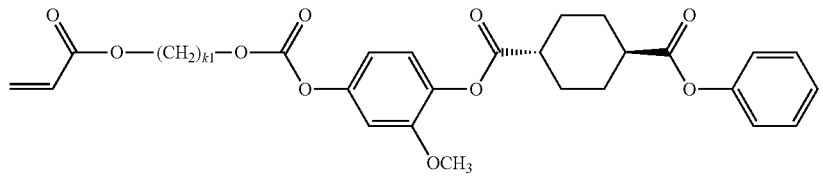
(IV-26)
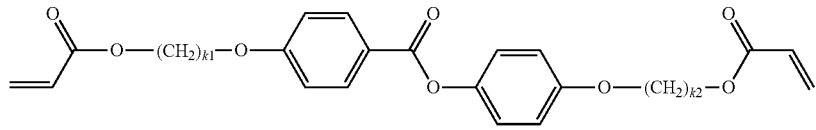
(V-1)
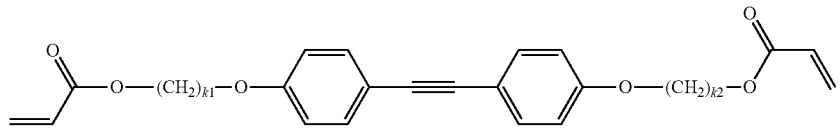
(V-2)
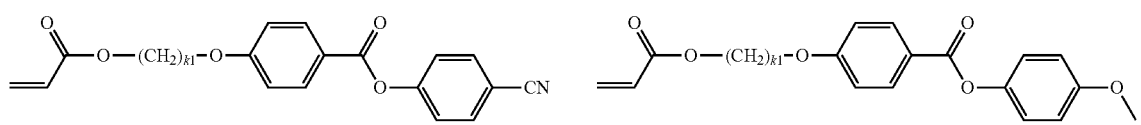
(VI-1)  (VI-2)
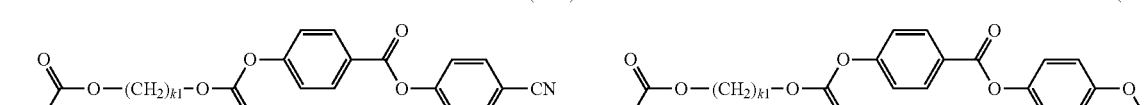
(VI-3)  (VI-4)
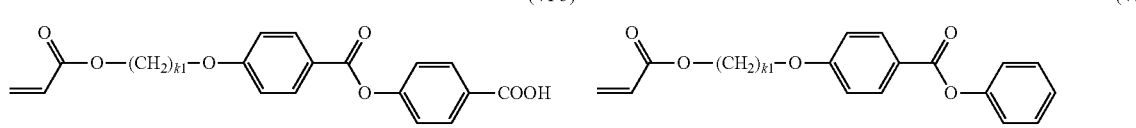
(VI-5)  (VI-6)

The optically-anisotropic-layer-forming composition may contain, besides the above-mentioned polymerizable liquid crystal compound, a polymerization initiator, a polymerization inhibitor, a photosensitizer, a levelling agent, a chiral agent, a reactive additive, a solvent and/or some other. The optically-anisotropic-layer-forming composition preferably contains a polymerization initiator.

[Polymerization Initiator]

The polymerization initiator is preferably a photopolymerization initiator. The photopolymerization initiator is preferably a photopolymerization initiator that generates radicals by irradiation with light.

Examples of the photopolymerization initiator include benzoin compounds, benzophenone compounds, benzyl ketal compounds, α-hydroxyketone compounds, α-aminoketone compounds, α-acetophenone compounds, triazine compounds, iodonium salts and sulfonium salts. Specific examples thereof include products Irgacure (registered trademark) 907, 184, 651, 819, 250 and 369 (all the products are manufactured by Ciba Japan K.K.); Seikuol (registered trademark) BZ, Z, BEE (all the products are manufactured by Seiko Chemical Co., Ltd.); Kayacure (registered trademark) BP100 (manufactured by Nippon Kayaku Co., Ltd.); UVI-6992 (manufactured by the Dow Chemical Company); Adeka Optomer (registered trademark) SP-152, and SP-170 (all the products are manufactured by Adeka Corporation); TAZ-A and TAZ-PP (all the products are manufactured by Nihon Siber Hegner K.K.), and TAZ-104 (manufactured by Sanwa Chemical Co., Ltd.). Of these examples, preferred are α-acetophenone compounds. Examples of the α-acetophenone compounds include 2-methyl-2-morpholino-1-(4-methylsulfanylphenyl)propane-1-one, 2-dimethylamino-1-(4-morpholinophenyl)-2-benzylbutane-1-one, and 2-dimethylamino-1-(4-morpholinophenyl)-2-(4-methylphenylmethyl)butane-1-one. Preferred are 2-methyl-2-morpholino-1-(4-methylsulfanylphenyl)propane-1-one, and 2-dimethylamino-1-(4-morpholinophenyl)-2-benzylbutane-1-one. Commercially available product examples of the α-acetophenone compounds include products Irgacure (registered trademark) 369, 379EG, and 907 (all the products are manufactured by BASF Japan Ltd.), and Seikuol (registered trademark) BEE (manufactured by Seiko Chemical Co., Ltd.).

The amount of the polymerization initiator is usually from 0.1 to 30 parts by mass, preferably from 0.5 to 10 parts by mass for 100 parts by mass of the polymerizable liquid crystal compound. When the amount is in the range, the polymerizable liquid crystal compound can be polymerized without disturbing the liquid crystal orientation of this compound.

[Polymerization Inhibitor]

Examples of the polymerization inhibitor include hydroquinone and hydroquinone analogues each having, as a substituent, an alkyl ether or the like; catechol compounds each having, as a substituent, an alkyl ether or the like, such as butylcatechol; radical capturing agents such as pyrogallol compounds, and 2,2,6,6-tetramethyl-1-piperidinyloxy radicals; thiophenol compounds; β-naphthylamine compounds; and β-naphthol compounds.

The content of the polymerization inhibitor in the composition is usually from 0.1 to 30 parts by mass, preferably from 0.5 to 10 parts by mass for 100 parts by mass of the polymerizable liquid crystal compound. When the content is in the range, the liquid crystal orientation of the polymerizable liquid crystal compound is not easily disturbed, or the polymerizable liquid crystal compound can be polymerized without disturbing the liquid crystal orientation of this compound.

[Photosensitizer]

Examples of the photosensitizer include xanthone, and xanthone analogues such as thioxanthone; anthracene, and anthracene analogues such as anthracene having a substituent such as an alkylether group; phenothiazine; and rubrene.

The use of the photosensitizer makes it possible to enhance the sensitivity of the photopolymerization initiator. The content of the photosensitizer in the composition is usually from 0.1 to 30 parts by mass, preferably from 0.5 to 10 parts by mass for 100 parts by mass of the polymerizable liquid crystal compound.

[Levelling Agent]

Examples of the levelling agent include organic modified silicone oil based and polyacrylate based levelling agents, and perfluoroalkyl-containing levelling agents. Specific examples thereof include products DC3PA, SH7PA, DC11PA, SH28PA, SH29PA, SH30PA, ST80PA, ST86PA, SH8400, SH8700, and FZ2123 (all the products are manufactured by Dow Corning Toray Co., Ltd.); KP321, KP323, KP324, KP326, KP340, KP341, X22-161A, and KF6001 (all the products are manufactured by Shin-Etsu Chemical Co., Ltd.); TSF400, TSF401, TSF410, TSF4300, TSF4440, TSF4445, TSF-4446, TSF4452, and TSF4460 (all the products are manufactured by Momentive Performance Materials Japan LLC); Fluorinert (registered trademark) FC-72, FC-40, FC-43, and FC-3283 (all the products are manufactured by Sumitomo 3M Limited); Megafac (registered trademark) R-08, R-30, R-90, F-410, F-411, F-443, F-445, F-470, F-477, F-479, F-482, and F-483 (all the products are manufactured by DIC Corporation); Eftop (trade name) EF301, EF303, EF351, and EF352 (all the products are manufactured by Mitsubishi Material Electronic Chemicals Co., Ltd.); Surflon (registered trademark) S-381, S-382, S-383, S-393, SC-101, SC-105, KH-40, and SA-100 (all the products are manufactured by AGC Seimi Chemical Co., Ltd.); E1830 and E5844 ((trade names) manufactured by Daikin Fine Chemical Laboratory, Ltd.); and BM-1000, BM-1100, BYK-352, BYK-353, and BYK-361N ((trade names) manufactured by a company, BM Chemie GmbH). Such levelling agents may be used in any combination of two or more thereof.

The levelling agent makes it possible to yield a smoother optically anisotropic film, and to control the fluidity of the optically-anisotropic-layer-forming composition or adjust the crosslinkage density of the optically anisotropic film in the production process of the optically anisotropic film. The content of the levelling agent in the composition is usually from 0.1 to 30 parts by mass, preferably from 0.1 to 10 parts by mass for 100 parts by mass of the polymerizable liquid crystal compound.

[Chiral Agent]

The chiral agent may be a known chiral agent (for example, agents described in "Liquid Crystal Device Handbook", Chapter 3, 4-3, Chiral Agents for TN and STN, p. 199, edited by Japan Society for the Promotion of Science, 142 Committee, 1989).

The chiral agent generally contains an asymmetric carbon atom. The chiral agent may be an axially asymmetric compound or planarly asymmetric compound, which contains no asymmetric carbon atom. Examples of the axially asymmetric compound or planarly asymmetric compound include binaphthyl, helicene, paracyclophane, and derivatives of these compounds.

Specific examples of the chiral agent include compounds as described in JP-A-2007-269639, JP-A-2007-269640, JP-A-2007-176870, JP-A-2003-137887, JP-A-2000-515496, JP-A-2007-169178, and JP-A-09-506088. The chiral agent is preferably a product Paliocolor (registered trademark) LC756 manufactured by the company BASF Japan Ltd.

The content of the chiral agent in the composition is usually from 0.1 to 30 parts by mass, preferably from 1.0 to 25 parts by mass for 100 parts by mass of the polymerizable liquid crystal compound. When the content is in the range, the liquid crystal orientation of the polymerizable liquid crystal compound is not easily disturbed, or the polymerizable liquid crystal compound can be polymerized without disturbing the liquid crystal orientation of this compound.

[Reactive Additive]

The reactive additive is preferably a compound having in the molecule thereof a carbon-carbon unsaturated bond and an active hydrogen reactive group. The wording "active hydrogen reactive group" as used herein means a group reactive with an active hydrogen-containing group, such as a carboxyl group (—COOH), hydroxyl group (—OH) or amino group (—NH$_2$). Typical examples thereof include glycidyl, oxazoline, carbodiimide, aziridine, imide, isocyanato, thioisocyanato, and maleic anhydride groups.

It is preferred that the reactive additive has at least two active hydrogen reactive groups. In this case, the active hydrogen reactive groups may be the same or different.

The carbon-carbon unsaturated bond that the reactive additive has may be a carbon-carbon double bond, a carbon-carbon triple bond, or a combination of the two, and is preferably a carbon-carbon double bond. It is particularly preferred that the reactive additive contains, as its carbon-carbon unsaturated bond(s), a vinyl group and/or a (meth)acrylic group. Furthermore, the reactive additive preferably has, as its active hydrogen reactive group(s), at least one selected from the group consisting of epoxy, glycidyl and isocyanato groups, and in particular preferably has an acrylic group and an isocyanato group.

Specific examples of the reactive additive include compounds each having a (meth)acrylic group and an epoxy group, such as methacryloxy glycidyl ether and acryloxy glycidyl ether; compounds each having a (meth)acrylic group and an oxetane group, such as oxetane acrylate and oxetane methacrylate; compounds each having a (meth)acrylic group and a lactone group, such as lactone acrylate and lactone methacrylate; compounds each having a vinyl group and an oxazoline group, such as vinyl oxazoline, and isopropenyl oxazoline; and oligomers each made from a compound having a (meth)acrylic group and an isocyanato group, such as isocyanatomethyl acrylate, isocyanatomethyl methacrylate, 2-isocyanatoethyl acrylate, and 2-isocyanatoethyl methacrylate. Other examples thereof include compounds each having a vinyl group or vinylene group, and an acid anhydride, such as methacrylic anhydride, acrylic anhydride, maleic anhydride, and vinylmaleic anhydride. Of these examples, preferred are methacryloxy glycidyl ether, acryloxy glycidyl ether, isocyanatomethyl acrylate, isocyanatomethyl methacrylate, vinyl oxazoline, 2-isocyanatoethyl acrylate, 2-isocyanatoethyl methacrylate, and the above-mentioned oligomers. Particularly preferred are isocyanatomethyl acrylate, 2-isocyanatoethyl acrylate, and the oligomers.

More preferred examples of the reactive additive having, as its active hydrogen reactive group, an isocyanato group are specifically compounds each represented by the following formula (Y):

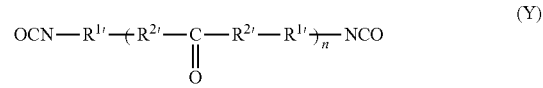

wherein n represents an integer of 1 to 10, $R^{1'}$'s each represent a bivalent aliphatic or alicyclic hydrocarbon group having 2 to 20 carbon atoms, or a bivalent aromatic hydrocarbon group having 5 to 20 carbon atoms; and one of two $R^{2'}$ in each of the recurring units is a group represented by —NH— and the other is a group represented by >N—C(=O)—$R^{3'}$ wherein $R^{3'}$ represents a hydroxyl group, or a group having a carbon-carbon unsaturated bond.

At least one of $R^{3'}$'s in the formula (Y) is a group having a carbon-carbon unsaturated bond.

Of the reactive additives represented by the formula (Y), particularly preferred is a compound represented by the following formula (YY) in which n has the same meaning as described above (hereinafter the compound may be referred to as the "compound (YY)"):

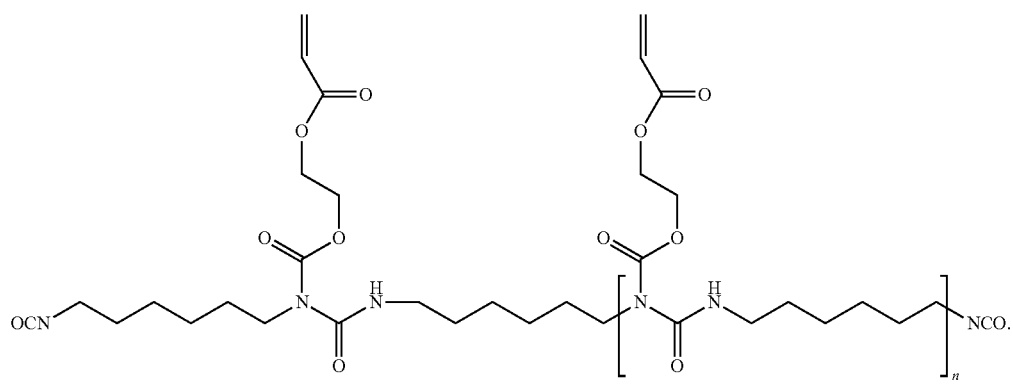

As the compound (YY), a commercially available product is usable as it is, or in the state of being purified if necessary. An example of the commercially available product is a product Laromer (registered trademark) LR-9000 (manufactured by the company BASF).

The content of the reactive additive in the composition is usually from 0.1 to 30 parts by mass, preferably from 0.1 to 5 parts by mass for 100 parts by mass of the polymerizable liquid crystal compound.

[Solvent]

The optically-anisotropic-layer-forming composition preferably contains a solvent, in particular, an organic solvent to make the operability for optically-anisotropic-film production good. The organic solvent is preferably an organic solvent in which the polymerizable liquid crystal compound, and other constituent components for the optically-anisotropic-layer-forming composition are soluble, more preferably a solvent which is inactive to the polymerization reaction of the polymerizable liquid crystal compound, the solvent in which the polymerizable liquid crystal compound and other constituent components for the optically-anisotropic-layer-forming composition are soluble. Specific examples thereof include alcohol solvents such as methanol, ethanol, ethylene glycol, isopropyl alcohol, propylene glycol, methylcellosolve, butylcellosolve, propylene glycol monomethyl ether, and phenol; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane and heptane; non-chlorinated aromatic hydrocarbon solvents such as toluene, and xylene; nitrile solvents such as acetonitrile; ether solvents such as tetrahydrofuran, and dimethoxyethane; and chlorinated hydrocarbon solvents such as chloroform, and chlorobenzene. Such solvents may be used in any combination of two or more thereof. Of these examples, preferred are alcohol solvents, ester solvents, ketone solvents, non-chlorinated aliphatic hydrocarbon solvents and non-chlorinated aromatic hydrocarbon solvents.

The content of the solvent in the composition is preferably from 10 to 10000 parts by mass, more preferably from 100 to 5000 parts by mass for 100 parts by mass of any solid therein. The concentration of the solid in the optically-anisotropic-layer-forming composition is preferably from 2 to 50% by mass, more preferably from 5 to 50% by mass of the composition. The "solid" means the total of the components obtained by removing the solvent from the optically-anisotropic-layer-forming composition.

When the resultant optically anisotropic film shows a liquid crystal phase such as a nematic phase, the film has birefringence based on mono-domain orientation.

The thickness of the optically anisotropic film is appropriately adjustable in accordance with the usage thereof, and is preferably from 0.1 to 10 μm, more preferably from 0.2 to 5 μm in order to make this film small in photoelasticity.

Examples of the method for the application include extrusion coating, direct gravure coating, reverse gravure coating, CAP coating, slit coating, and die coating methods; and a method of attaining the application, using a coater such as a dip coater, a bar coater, or a spin coater. Preferred are CAP coating, inkjet coating, dip coating, slit coating, die coating, and bar-coater-used coating methods since these methods make it possible to attain the application continuously in a roll-to-roll manner. When a roll-to-roll manner is employed, it is possible to apply the oriented-film-forming composition onto the resin substrate to form an oriented film, and continuously form an optically anisotropic film onto the outer surface of the resultant oriented film.

Examples of the method for the drying include the same methods as used for drying the oriented-film-forming composition when the oriented-film-attached resin substrate is produced. Of these examples, preferred are natural drying and heat drying. The drying temperature is preferably from 0 to 250° C., more preferably from 50 to 220° C., even more preferably from 80 to 170° C. The drying period is preferably from 10 seconds to 60 minutes, more preferably from 30 seconds to 30 minutes.

The polymerizable liquid crystal compound may be polymerized to harden the film. The optically anisotropic film obtained by polymerizing the polymerizable liquid crystal compound is not easily affected by a change in the birefringence thereof on the basis of heat since the liquid crystal orientation of the polymerizable liquid crystal compound is fixed.

The method for polymerizing the polymerizable liquid crystal compound is preferably photopolymerization. The photopolymerization makes it possible to polymerize the compound at a low temperature. Thus, the choice of a resin substrate to be used is widened from the viewpoint of heat resistance. Reaction for the photopolymerization is usually conducted by irradiation with visible rays, ultraviolet rays or a laser, and is preferably conducted by irradiation with ultraviolet rays.

When the applied optically-anisotropic-layer-forming composition contains a solvent, the irradiation with the light is performed preferably after the solvent is removed by drying. The drying may be performed simultaneously with the irradiation with the light. Preferably, before the irradiation with the light is performed, almost all of the solvent should be removed.

The optical anisotropic laminated body obtained by the producing method of the present invention is excellent in transparency into visible ray range, and is useful as members for various display devices.

The haze value of the optical anisotropic laminated body is usually 1.5% or less, preferably 0.5% or less, more preferably 0.3% or less, even more preferably 0.25% or less.

The optical anisotropic laminated body in which its optically anisotropic film is a retardation film is particularly useful as a laminated body for converting, into circularly polarized light or elliptically polarized light, polarized light considered to be linearly polarized light when the polarized light is checked from any oblique angle at the light-radiating-out side of the body; for converting polarized light considered to be circularly or elliptically polarized light into linearly polarized light; or for changing the polarization direction of linearly polarized light.

Optical anisotropic laminated bodies in each of which its optically anisotropic film is a retardation film may be laminated onto each other, or the laminated body in which its optically anisotropic film is a retardation film may be combined with a different film. The combination with the different film is usable as a viewing angle compensating film, a viewing angle enlarging film, an antireflective film, a polarizing plate, a circularly polarizing plate, an elliptically polarizing plate, or a brightness enhancement film.

The laminated body can be changed in optical property in accordance with the orientation state of the polymerizable liquid crystal compound. The laminated body is usable as a retardation plate for a liquid crystal display device that may be in various modes such as a vertical alignment (VA) mode, an in-plane switching (IPS) mode, an optically compensated bend (OCB) mode, a twisted nematic (TN) mode, and a super twisted nematic (STN) mode. The laminated body is preferably usable particularly for an IPS mode liquid crystal display device.

When the refractive index of the laminated body in the in-plane slow axis direction thereof is represented by $n_x$, that in the direction orthogonal to the in-plane slow axis (i.e., the fast axis direction) by $n_y$, and that in the thickness direction thereof by $n_z$, the laminated body can be classified as follows:

a positive A plate in which $n_x > n_y \cong n_z$,
a negative C plate in which $n_x \cong n_y > n_z$,
a positive C plate in which $n_x \cong n_y < n_z$, and
a positive O plate and a negative O plate in which $n_x \neq n_y \neq n_z$.

It is advisable to select the retardation value of the laminated body appropriately from the range of 30 to 300 nm in accordance with a display device in which the laminated body is used.

When the laminated body is used as a positive C plate, it is advisable to adjust the front retardation value Re (549) into the range of 0 to 10 nm, preferably into that of 0 to 5 nm, and adjust the thickness direction retardation value $R_{th}$ into the range of −10 to −300 nm, preferably into that of −20 to −200 nm. It is particularly preferred to adjust these values in accordance with properties of the liquid crystal cell.

The thickness direction retardation value $R_{th}$, which means the refractive index anisotropy of the laminated body in the thickness direction, can be calculated from the retardation value $R_{40}$ measured in the state of inclining the in-plane fast axis of the body at 40 degrees to be rendered an inclined axis, and the in-plane retardation value $R_0$. Specifically, the thickness direction retardation value $R_{th}$ can be calculated by: using plural values (i.e., the in-plane retardation value $R_0$, the retardation value $R_{40}$, which is measured in the state of inclining the fast axis at 40 degrees to be rendered an inclined axis, the retardation film thickness d, and the average refractive index no of the retardation film) to calculate the refractive indexes $n_x$, $n_y$ and $n_z$ through equations (9) to (11) described below; and then substituting these refractive indexes for an equation (8) described below.

$$R_{th} = [(n_x + n_y)/2 - n_z] \times d \qquad (8),$$

$$R_0 = (n_x - n_y) \times d \qquad (9),$$

$$R_{40} = (n_x - n_y') \times d/\cos(\phi) \qquad (10), \text{ and}$$

$$(n_x + n_y + n_z)/3 = n_0 \qquad (11)$$

wherein
$\phi = \sin^{-1}[\sin(40°)/n_0]$, and
$n_y' = n_y \times n_z / [n_y^2 \times \sin^2(\phi) + n_z^2 \times \cos^2(\phi)]^{1/2}$.

The optical anisotropic laminated body obtained by the producing method of the present invention is also useful as a member constituting a polarizing plate.

Specific examples of the polarizing plate include respective polarizing plates 4a to 4e illustrated in FIGS. 1A to 1E. The polarizing plate 4a illustrated in FIG. 1A is a polarizing plate in which a retardation film and a polarization film 2 are laminated directly onto each other. The polarizing plate 4b illustrated in FIG. 1B is a polarizing plate in which a retardation film 1 and a polarization film 2 are bonded onto each other through an adhesive layer 3'. The polarizing plate 4c illustrated in FIG. 1C is a polarizing plate in which retardation films 1 and 1' are laminated onto each other and further a polarization film 2 is laminated onto the retardation film 1'. The polarizing plate 4d illustrated in FIG. 1D is a polarizing plate in which retardation films 1 and 1' are bonded onto each other through an adhesive layer 3, and further a polarization film 2 is laminated onto the retardation film 1'. The polarizing plate 4e illustrated in FIG. 1E is a polarizing plate in which retardation films 1 and 1' are bonded onto each other through an adhesive layer 3, and further the retardation film 1' and a polarization film 2 are bonded onto each other through an adhesive layer 3'. The wording "adhesive" is a generic name of any adhesive and/or any binder.

The optical anisotropic laminated body in which its optically anisotropic film is a retardation film is usable as each of the retardation films 1 and 1'. The optical anisotropic laminated body in which its optically anisotropic film is a polarization film is usable as each of the polarization films 2.

It is sufficient for each of the polarization films 2 to be a film having a polarizing function. Besides the optical anisotropic laminated body, the following is usable therefor: a film obtained by causing iodine or a dichroic dye to be adsorbed to a polyvinyl alcohol based film, and then drawing the resultant film; or a film obtained by drawing a polyvinyl alcohol based film, and then causing iodine or a dichroic dye to be adsorbed to the drawn film.

The polarization film 2 may be protected with a protective film if necessary. Examples of the protective film include polyolefin films, examples of the polyolefin including polyethylene, polypropylene and norbornene polymers; and polyethylene terephthalate, polymethacrylate, polyacrylate, cellulose ester, polyethylene naphthalate, polycarbonate, polysulfone, polyethersulfone, polyetherketone, polyphenylenesulfide, and polyphenyleneoxide films.

The adhesive that forms the adhesive layers 3 and 3' is preferably an adhesive high in transparency and excellent in heat resistance. Examples of the adhesive include acrylic based, epoxy based and urethane based adhesives.

Examples of a display device having an optical anisotropic laminated body obtained by the producing method of the present invention include a liquid crystal display device having a liquid crystal panel in which the optical anisotropic laminated body obtained by the producing method of the present invention and a liquid crystal panel body are bonded to each other; and an organic electroluminescence (also abbreviated to EL hereinafter) display device having an organic EL panel in which the optical anisotropic laminated body obtained by the producing method of the present invention and a luminous layer are bonded to each other. Hereinafter, a description will be made about liquid crystal display devices as embodiments of the display device having the optical anisotropic laminated body.

Figure 2:
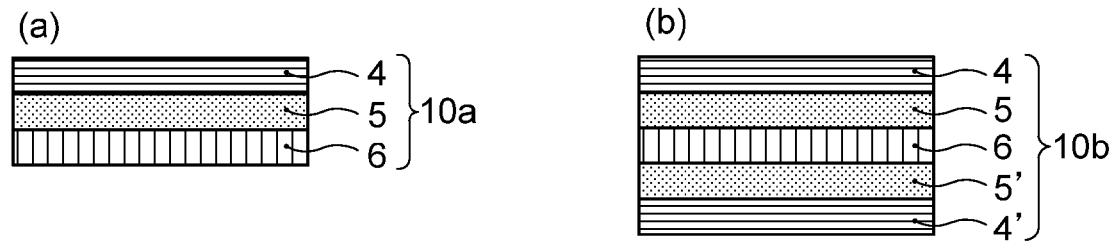
FIGS. 2A and 2B are each a schematic view illustrating an example of a display device including an optically anisotropic laminated body obtained by the producing method of the present invention.

In embodiments, the liquid crystal display devices are shown as liquid crystal display devices 10a and 10b illustrated in FIGS. 2A and 2B, respectively. In the liquid crystal display device 10a illustrated in FIG. 2A, a polarizing plate 4 containing an optical anisotropic laminated body obtained by the producing method of the present invention and a liquid crystal panel 6 are bonded through an adhesive layer 5. In the liquid crystal display device 10b illustrated in FIG. 2B, a polarizing plate 4 containing an optical anisotropic laminated body obtained by the producing method of the present invention is bonded to one of the two main surfaces of a liquid crystal panel 6 through an adhesive layer 5 while a polarizing plate 4' containing an optical anisotropic laminated body obtained by the producing method of the present invention is bonded to the other main surface of the liquid crystal panel 6 through an adhesive layer 5'. In these liquid crystal display devices, electrodes not illustrated are used to apply a voltage to their liquid crystal panel to change the orientation of molecules of their liquid crystal. In this way, a monochrome display can be realized.

Examples

Hereinafter, the present invention will be more specifically described by way of working examples thereof. In the examples, the symbol "%" and the word "part(s)" denote "% by mass" and "part(s) by mass", respectively, unless otherwise specified.

[Oriented-Film-Forming Composition]

Ethylcyclohexane was added to a solution in which N-methyl-2-pyrrolidone and butylcellosolve were added to an orienting polymer to yield each of oriented-film-forming compositions (1) to (3) and (H1) to (H3).

Table 1 shows these components in its top row. The proportion of the amount of each of the components to the total amount of each of the compositions is represented by a numerical value inside the corresponding parentheses in the corresponding row in Table 1. The proportion of any solid in the orienting polymer is converted from the polymer concentration described in a delivered specification of the polymer.

TABLE 1

|      | Orienting polymer | N-methyl-2-pyrrolidone | Butylcellosolve | Ethylcyclohexane |
|------|-------------------|------------------------|-----------------|------------------|
| (1)  | 0.32 kg (1.0%)    | 17.6 kg (64.0%)        | 4.4 kg (16.0%)  | 6.12 kg (19.1%)  |
| (2)  | 0.32 kg (0.5%)    | 21.2 kg (75.5%)        | 5.3 kg (18.9%)  | 1.53 kg (5.1%)   |
| (3)  | 0.32 kg (0.5%)    | 20.0 kg (71.4%)        | 5.0 kg (17.9%)  | 3.06 kg (10.2%)  |
| (H1) | 0.64 kg (0.5%)    | 20.0 kg (72.3%)        | 5.0 kg (18.1%)  | 3.06 kg (9.1%)   |
| (H2) | 0.64 kg (0.5%)    | 17.6 kg (72.3%)        | 4.4 kg (18.1%)  | 6.12 kg (9.1%)   |
| (H3) | 0.36 kg (1.1%)    | 19.0 kg (71.4%)        | 5.0 kg (18.0%)  | 3.04 kg (9.5%)   |

Orienting polymer: Sunever (registered trademark) SE-610 (manufactured by Nissan Chemical Industries, Ltd.)

[Optically-Anisotropic-Layer-Forming Composition]

Individual components shown in Table 2 were mixed with each other, and the resultant solution was stirred at 80° C. for 1 hour. The solution was then cooled to room temperature to yield an optically-anisotropic-layer-forming composition (1).

TABLE 2

|     | Polymerizable liquid crystal compound | Photopolymerization initiator | Levelling agent | Reactive additive | Solvent |
|-----|--------------------------------------|-------------------------------|-----------------|-------------------|---------|
| (1) | 19.2%                                | 0.5%                          | 0.1%            | 1.1%              | 79.1%   |

Unit in the table: % (the proportion of each of the components in the optically-anisotropic-layer-forming composition)

Polymerizable liquid crystal compound: a polymerizable liquid crystal compound represented by the following formula (manufactured by the company BASF):

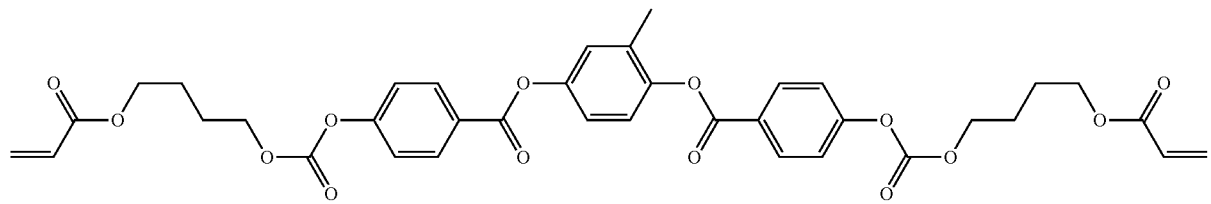

LC242

Photopolymerization initiator: Irgacure (registered trademark) 369 ((trade name) manufactured by BASF Japan Ltd.)

Levelling agent: BYK-361N ((trade name) manufactured by BYK-Chemie Japan K.K.)

Reactive additive: Laromer (registered trademark) LR-9000 (manufactured by BASF Japan Ltd.)

Solvent: propylene glycol monomethyl ether acetate

Example 1

While a cycloolefin polymer film (ZF-14, manufactured by Zeon Corporation) was carried at a speed of 5 m/min, a surface thereof was subjected to plasma treatment in a normal-pressure plasma surface treatment machine (roll direct head type AP-T04S-R890) manufactured by Sekisui Chemical Co., Ltd. A die coater was used to apply the oriented-film-forming composition (1) onto the plasma-treated surface. The workpiece was dried to form an oriented-film-attached laminated body composed of an oriented film having a thickness of 40 nm and the substrate. A die coater was used to apply the optically-anisotropic-layer-forming composition (1) onto the outer surface of the oriented film of the laminated body. The workpiece was heated to 100° C. to be dried, and then cooled to room temperature. Thereafter, a high-pressure mercury lamp was used to radiate ultraviolet rays to the workpiece to yield an optically anisotropic laminated body (1) in which the resin substrate, the oriented film and an optically anisotropic film were laminated onto each other in this order.

Examples 2 and 3, and Comparative Examples 1 to 3

Optically anisotropic laminated bodies (2), (3), and (H1) to (H3) were produced in the same way as in Example 1 except that the oriented-film-forming composition (1) in Example 1 was changed to the oriented-film-forming compositions (2), (3), and (H1) to (H3), respectively.

[Viscosity Measurement]

About the oriented-film-forming compositions (1) to (3) and (H1) to (H3), a vibration viscometer (VM-10A, manufactured by CBC Materials Co., Ltd.) was used to measure the respective viscosities thereof at 25° C. The results are shown in Table 3.

[Transparency Evaluation]

A haze meter (model: HZ-2) manufactured by Suga Test Instruments Co., Ltd. was used to measure the respective haze values of the laminated bodies (1) to (3) and (H1) to (H3) by a double beam method. The results are shown in Table 3.

[Optical Property Measurement]

A measuring instrument (KOBRA-WR, manufactured by a company, Oji Scientific Instruments) was used to measure the orientation direction of the polymerized polymerizable liquid crystal compound contained in each of the optically anisotropic laminated bodies (1) to (3) and (H1) to (H3). The measurement was made while the incident angle of light into the sample of the optically anisotropic laminated body was varied. In this way, it was checked whether or not its liquid crystal was vertically oriented. The results are shown in Table 3.

[Defect Check]

About check as to whether or not each of the laminated bodies (1) to (3) and (H1) to (H3) had a defect, a polarization microscope (BX-51, manufactured by Olympus Corporation) was used to observe whether or not light leaked from the laminated body in a crossed nicol state at 200 magnifications. The results are shown in Table 3.

TABLE 3

| | Viscosity (mPa·s) | Haze (%) | Orientation | Defect |
|---|---|---|---|---|
| Example 1 | 3.38 | 0.21 | Vertically oriented | Not generated |
| Example 2 | 3.04 | 0.22 | Vertically oriented | Not generated |
| Example 3 | 2.78 | 0.13 | Vertically oriented | Not generated |
| Comparative Example 1 | 8.36 | 4.53 | Not oriented | Generated |
| Comparative Example 2 | 6.68 | 3.88 | Not oriented | Generated |
| Comparative Example 3 | 4.14 | 1.82 | Vertically oriented | Generated |

It was verified that in the optically anisotropic laminated bodies of Examples 1 to 3, the generation of any defect was restrained.

According to the producing method of the present invention, an optically anisotropic laminated body can be obtained in which defects are hardly generated so that light leakage is scarcely caused.

What is claimed is:

1. A method for producing an optically anisotropic laminated body comprising a substrate, an oriented film, and an optically anisotropic film, comprising: applying, to a surface of the substrate, an oriented-film-forming composition comprising an oriented-film-forming material and a solvent and having a viscosity of 4 mPa·s or less at 25° C., and drying the resultant to form the oriented film;

applying, onto the resultant oriented film, an optically-anisotropic-layer-forming composition comprising a polymerizable liquid crystal compound, and drying the resultant to orient the polymerizable liquid crystal compound vertically to the surface of the substrate to form the optically anisotropic film; and wherein the oriented-film-forming material comprises at least one selected from the group consisting of polyimides, polyamides, and polyamic acids.

2. The producing method according to claim 1, wherein the substrate comprises a polyolefin.

3. The producing method according to claim 1, wherein the oriented-film-forming composition is applied by use of any one selected from the group consisting of a die coater, a gravure coater and a slit coater.

4. The producing method according to claim 1, wherein at the time of applying the oriented-film-forming composition to the substrate surface and drying the resultant, the carrying speed of the substrate is 5 m/min or more.

5. The producing method according to claim 1, wherein the optically anisotropic film is a retardation film.

6. The producing method according to claim 1, wherein the laminated body is a laminated body for an in-plane switching (IPS) liquid crystal display device.

7. A polarizing plate, comprising the laminated body produced by the producing method recited in claim 1.

8. A display device, comprising the laminated body produced by the producing method recited in claim 1.

* * * * *